United States Patent
Pilard et al.

(10) Patent No.: US 9,845,382 B2
(45) Date of Patent: Dec. 19, 2017

(54) METHOD FOR PRODUCING FUNCTIONALISED TELECHELIC OLIGOMERS

(71) Applicants: Centre National de la Recherche Scientifique (CNRS), Paris (FR); Universite de Caen Basse-Normandie, Caen (FR); Universite du Maine, Le Mans (FR)

(72) Inventors: Jean-Francois Pilard, Pance (FR); Arnaud Nourry, La Bazoge (FR); Isabelle Dez, Colombelles (FR); Annie-Claude Gaumont, Bernieres-sur-Mer (FR); Ali Mouawia, Caen (FR)

(73) Assignees: Centre National de la Recherche Scientifique, Paris (FR); Universite de Caen Basse-Normandie, Caen (FR); Universite du Maine, Le Mans (FR)

( * ) Notice: Subject to any disclaimer, the term of this patent is extended or adjusted under 35 U.S.C. 154(b) by 0 days.

(21) Appl. No.: 15/101,064

(22) PCT Filed: Dec. 3, 2014

(86) PCT No.: PCT/FR2014/053149
§ 371 (c)(1),
(2) Date: Jun. 2, 2016

(87) PCT Pub. No.: WO2015/082842
PCT Pub. Date: Jun. 11, 2015

(65) Prior Publication Data
US 2017/0009043 A1  Jan. 12, 2017

(30) Foreign Application Priority Data
Dec. 3, 2013 (FR) ...................... 13 61980

(51) Int. Cl.
*C08J 11/22* (2006.01)
*C08C 2/04* (2006.01)
*C08C 19/08* (2006.01)
*C08C 19/28* (2006.01)
*C08L 19/00* (2006.01)
*C08J 11/16* (2006.01)
*C08C 19/00* (2006.01)

(52) U.S. Cl.
CPC ............. *C08J 11/22* (2013.01); *C08C 2/04* (2013.01); *C08C 19/08* (2013.01); *C08C 19/28* (2013.01); *C08J 11/16* (2013.01); *C08L 19/006* (2013.01); *C08C 2019/09* (2013.01); *C08J 2319/00* (2013.01); *C08J 2321/00* (2013.01)

(58) Field of Classification Search
CPC ....................................................... C08L 19/06
USPC ....................................................... 521/41.5
See application file for complete search history.

(56) References Cited

U.S. PATENT DOCUMENTS 8,962,765 B2 * 2/2015 Pilard .................... C08C 19/08
525/331.9

FOREIGN PATENT DOCUMENTS

| WO | 2011/101551 A1 | | 8/2011 | |
| WO | WO 2011101551 | * | 8/2011 | ............. C08C 19/08 |
| WO | 2013/098052 A2 | | 7/2013 | |
| WO | WO 2013098052 | * | 7/2013 | ............. C08C 19/08 |

OTHER PUBLICATIONS

Sadaka et al.; "Telechelic oligomers obtained by metathetic degradation of both polyisoperene and styrene-butadiene rubbers. Applications for recycling waste tyre rubber"; Polymer Degradation and Stability, vol. 98, No. 3, Dec. 28, 2012, pp. 736-742.
Gutierrez et al. "Degradation of Natural Rubber Via Cross-Metathesis with Functionalized Olefins Using Ruthenium Alkyliden Catalysts"; Revista Latinoamericana de Metalurgia y Materiales, vol. S1, No. 4, Jul. 21, 2009, pp. 1463-1467.
Lucas et al.; "Synthesis of dihydroxy poly(ethylene-co-butadiene) via metathetical depolymerization: Kinetic and mechanistic aspects"; Polymer, vol. 49, No. 23, Oct. 30, 2008, pp. 4935-4941.
Solansky et al.; "Metathetic Selective Degradation of Polyisoprene: Low-Molecular-Weight Telechelic Oligomer Obtained from Both Synthetic and Natural Rubber"; Macromolecular Chemistry and Physics, vol. 206, No. 10, May 17, 2005, pp. 1057-1063.

* cited by examiner

*Primary Examiner* — Terressa Boykin
(74) *Attorney, Agent, or Firm* — Whitham Curtis & Cook, PC

(57) ABSTRACT

This invention relates to a method for producing functionalized telechelic oligomers, comprising two steps. The first step relates to bringing a raw material comprising at least one high-molecular-weight polymer comprising at least two unsaturations, into contact with a solution comprising at least one metathesis catalyst and at least one functionalizing agent. The second step relates to the separation of the functionalized telechelic oligomers produced by the metathesis reaction in ionic liquid medium of the first step.

12 Claims, 2 Drawing Sheets

METHOD FOR PRODUCING FUNCTIONALISED TELECHELIC OLIGOMERS

FIELD OF THE INVENTION

This invention relates to the production of functionalised telechelic oligomers. More precisely, the invention relates to a method for producing functionalised telechelic oligomers by controlled degradation of polymeric chains. Said method comprises a metathesis reaction in the presence of a catalyst and of a functionalising agent in an ionic liquid medium.

PRIOR ART

Polymers are omnipresent in highly varied fields such as the automobile industry, transport, medical equipment or construction. Faced with the increase in the use of polymers, two major problems arise: (1) the synthesis of polymers that have specific properties according to the desired use and (2) the recycling of polymer waste.

The production of polymers can be carried out by polymerising monomers but this method is limited as to the diversity of the polymers that can be obtained. A more recent method is the obtaining of polymers using telechelic oligomers. The latter are linear oligomers having a function at each one of their two ends. Due to the presence of these two reactive groups, they can undergo polymerisation reactions allowing for the synthesis of new polymers of interest. They are as such used in the production of linear or branched long chains of polymers, but also in the formation of block copolymers of which the compatibilising properties are highly appreciated, in particular for carrying out multiphase structures.

Three main methods exist for preparing telechelic oligomers:
polymerising monomers,
functionalising commercial telechelic oligomers,
producing via degradation existing polymers.

While the first two methods are rather limited as to the diversity of the polymers that can be obtained, the interest of the third method is to be able to synthesise telechelic oligomers that have a length and functionalities that are suited to the use sought. Another advantage is to allow for the recycling of existing polymers in the case where polymer waste materials are used as raw material.

In prior art, U.S. Pat. No. 6,642,322 describes a method for preparing telechelic oligomers using polymers of the polyester, polyurethane or polycarbonate type. However, this method is carried out in organic solvents that are potentially toxic.

Another method has been developed recently that allows for the controlled degradation of tyre waste (WO 2011/101551). The method makes use of a chemical reaction that results in the degradation of the polydiene chains by a cleavage agent that is specific for double bonds such as periodic acid or metathesis catalysts, in the presence of a chain transfer agent (CTA). The method makes it possible to obtain telechelic oligomers bearing varied functions at the end of the chain and that can be used in new polymerisation reactions.

WO 2008/027269 also describes the degradation of polymers by metathesis allowing for the formation of telechelic oligomers. The oligomers obtained have an average functionality between 1.8 and 2.5 and the metathesis reaction is carried out in an organic solvent.

The methods of prior art have the disadvantage of using toxic organic solvents, do not allow for the controlling of the functionality of the telechelic oligomers produced, and the use of the metathesis catalyst can result in the contamination of the products of the reaction by the catalyst.

WO 2013/098052 describes a method for preparing a nitrile gum that has reduced molar masses. This method relates to a degradation reaction via metathesis in ionic liquid. However, this method does not describe the obtaining of telechelic oligomers having end-of-chain functionalities. In addition, no result concerning the recycling of the catalytic system was presented.

There is still therefore a need for the production of functionalised telechelic oligomers, in particular using polydienes, having a net functionality and a polydispersity controlled by an eco-compatible method and that does not result in the contamination of the oligomer obtained by organometallic catalysts.

The Applicant has as such developed a method for producing functionalised telechelic oligomers using high-molecular-weight polymers and having unsaturations. The method of the invention allows for the degradation of polymers catalytically in an ionic liquid medium and in the presence of a functionalising agent. The use of an ionic liquid medium makes it possible to limit the use of toxic solvents and allows for a recycling of the catalyst which substantially decreases the quantity of catalyst used. Indeed, at the end of the reaction, the products obtained are separated from the reaction medium but the catalyst remains in the ionic liquid medium which allows for extremely low contamination of the oligomer obtained by the catalyst and the obtaining of better yields due to the absence of by-products. Another advantage of the method of the invention concerns the properties of the telechelic oligomers obtained that have a controlled polydispersity and a net functionality.

Thanks to these characteristics, the telechelic oligomers obtained according to the method of the invention can make it possible to synthesise various polymers such as telechelic hydroxy-terminated polybutadiene (HTPB), the derivatives of polybutadiene used as pre-polymers for the production of composite propergols. They could also be used as a compatibiliser for the preparing of multiphase polymers.

Definitions

In this invention, the terms hereinbelow are defined in the following way:
"Raw material" relates to a high-molecular-weight polymer and having at least two unsaturations.
"net functionality" relates to the exact number of functionalities that each oligomer has; the term functionality designates a reactive site that allows for polymerisation reactions, with their number being determined by NMR$^1$H and $^{13}$C and Infrared.
"waste" relates to any residue from a process of producing, transforming or using, any substance, material or more generally any property or furnishing refused, unwanted, abandoned or that its holder intends to abandon.
"tyre waste" relates to used tyres, waste from the production of tyres and waste from retreading, and in particular split tyres, shreds, granulates, crumbs.
"split tyre" relates to a tyre that has been output into pieces of which the size is greater than 300 mm.
"shreds" relates to a tyre that has been output into irregular pieces of 15 to 300 mm.

"granulates" relates to the pieces of tyre reduced to a granulometry between 1 and 15 mm by a mechanical, cryogenic or thermal process.

"crumb" relates to a powder formed from particles with a granulometry less than 1 mm, generally obtained via mechanical, cryogenic or thermal reduction.

"treatment solvents" relate to the mixture of the solvent used to stop the degradation reaction via metathesis and of the solvent allowing for the precipitation of telechelic oligomers in the reaction medium.

"precipitation solvent" relates to a solvent that is miscible with the ionic liquid but wherein the telechelic oligomers are not soluble and as such make it possible at the end of the reaction to separate the ionic liquid and the telechelic oligomers via precipitation of the latter.

"high molecular weight" relates to a polymer before it is degraded by the method of the invention and of which the number average molecular weight Mn, measured by steric exclusion chromatography, is from 1.5 to 90 times greater than the polymer obtained after degradation.

"unsaturation" this term relates to the existence of multiple bonds (double or triple) within a molecule; more preferably, carbon-carbon unsaturations.

DETAILED DESCRIPTION

As such, the invention has for object a method for producing functionalised telechelic oligomers, comprising:
a) bringing a raw material consisting of at least one high-molecular-weight polymer having at least two unsaturations into contact with a solution comprising or consisting of at least one ionic liquid, at least one metathesis catalyst and at least one functionalising agent;
b) the separation of the functionalised telechelic oligomers produced by the metathesis reaction in an ionic liquid medium of the step a).

According to a particular embodiment, the raw material is put into solution with an ionic liquid before it is brought into contact with the solution comprising a metathesis catalyst and a functionalising agent.

According to an embodiment, the method according to the invention comprises a prior step wherein the ionic liquid is prepared.

According to an embodiment, the method according to the invention comprises a step wherein the metathesis catalyst contained in the liquid medium resulting from the separation of the step b) is recycled.

The raw material can be highly varied. According to a first embodiment, the raw material is comprised of unsaturated polymers, in particular of unsaturated elastomers, of unsaturated thermoplastic polymers, of unsaturated thermosetting polymers, or of unsaturated plastomers. According to a particular embodiment, the raw material does not comprise nitrile functions. According to a particular embodiment, the raw material comprises solely unsaturations of the carbon-carbon type.

According to a particular embodiment of the invention, the raw material is an unsaturated copolymer, of the type obtained by copolymerisation of ethylene, of propylene, of butadiene, of octene, of benzene and/or of styrene. According to a first embodiment of the invention, the raw material is an EPDM (ethylene-propylene-diene monomer). According to a second embodiment of the invention, the raw material is an EO (ethylene-octene). According to a third embodiment of the invention, the raw material is an EB (ethylbenzene). According to a fourth embodiment of the invention, the raw material is an SEBS (styrene-ethylene-butadiene-styrene). According to a fifth embodiment of the invention, the raw material is a polynorbornene. According to a sixth embodiment of the invention, the raw material is an SBR (abbreviation of: Styrene-Butadiene Rubber). According to a seventh embodiment of the invention, the raw material is a polybutadiene. According to an eighth embodiment, the raw material is an NBR (acrylonitrile-butadiene, abbreviation of: Nitrile Butadiene Rubber). According to a ninth embodiment, the raw material is an HNBR (partially hydrogenated acrylonitrile-butadiene, abbreviation of: Hydrogenated Nitrile-Butadiene Rubber). According to a tenth embodiment of the invention, the raw material is an SBS (Styrene-Butadiene-Styrene). According to an eleventh embodiment of the invention, the raw material is a TPE (thermoplastic elastomer, abbreviation of Thermo-Plastic Elastomer). According to a twelfth embodiment of the invention, the raw material is a TPS (styrenic block copolymer, abbreviation of Thermo-Plastic Elastomer Styrenic). According to a thirteenth embodiment of the invention the raw material is a styrenic block copolymer selected from the group comprising SIS (Styrene-Isoprene-Styrene), SEBS (Styrene-Ethylene-Butylene-Styrene), SEPS (Styrene-Ethylene-Propylene-Styrene), and SEEPS (Styrene-Ethylene-Ethylene/Propylene-Styrene).

According to an embodiment, the raw material is a mixture of polymers selected from the group comprising EPDM, EO, EB, SEBS, SBR, NBR, HNBR, SBS, TPE, TPS, SIS, SEBS, SEPS, SEEPS.

According to another embodiment, the raw material is a mixture of natural and/or synthetic elastomers.

According to another embodiment, the raw material is an unsaturated polymer which is a waste containing unsaturated polymers, in particular rubber. The properties that make the polymers interesting make the materials made from them not biodegradable and difficult to recycle. Using them to produce telechelic oligomers is therefore an ecological means of recycling and makes it possible to recover polymer waste. In this embodiment, said waste containing unsaturated polymers comes (1) from the automobile industry and in particular includes tyres, windscreen wipers, airbags; (2) from the general public and in particular includes gloves for household or medical use, teats, floor mats; (3) the construction industry and in particular includes seals, hoses, cables.

Advantageously, the raw material is a tyre waste. The tyre waste can have the form of a split tyre, shreds, crumbs or granulates, preferably crumbs or granulates, generally obtained by removing the metallic part of the tyre, lowering the temperature and crushing of used tyres. In this embodiment, the method of the invention wherein the raw material is a waste material containing rubber, preferably a tyre waste, is simultaneously a method for degradating and for recycling said waste material and a method for producing telechelic oligomers.

As such, the method of the invention has the double advantage of allowing for the recycling of existing polymers for the production of new polymers.

According to an embodiment of the invention, the metathesis catalyst is comprised of a metal, of an alkylidene and of ligands. In this embodiment, the metal is selected from the group comprising ruthenium (Ru), molybdenum (Mo), Rhodium (Rh), tungsten (W), titanium (Ti), more preferably ruthenium.

According to an embodiment, the catalyst is selected from the group comprising the Grubbs I catalyst ([RuCl$_2$(PCy$_3$)$_2$(=CHPh)], the Grubbs II catalysts ([RuCl$_2$(PCy$_3$)(SIMes)

(=CHPh)] and [RuCl$_2$(PCy$_3$)(IMes)(=CHPh)]), the Hoveyda-Grubbs I catalyst ([RuCl$_2$(PCy$_3$)(=CH—O$^i$Pr—C$_6$H$_4$)]) and the Hoveyda-Grubbs II catalyser ([RuCl$_2$(SIMes)(=CH—O$^i$Pr—C$_6$H$_4$)]), or any catalyst obtained by replacing at least one of the ligands of the aforementioned catalysts with a ligand selected from the group comprising PPh$_3$, P$^i$PR$_3$, R being a substituted or unsubstituted alkyl group, PCy$_3$, O$^i$Pr, IMes, SIMes, IPr, SIPr and IBu; or any catalyst obtained by replacing the alkylidene of the aforementioned catalysts with an alkylidene selected from the group comprising styrene, 2-(2-propoxy)styrene, 3-phenyl-2-(2-propoxy)styrene, 4-nitro-2-(2-propoxy)styrene, 3-cyano-2-(2-propoxy)styrene.

According to another embodiment, the metathesis catalyst can be grafted onto a polymer, a resin or silica.

According to a particular embodiment, the metathesis catalyst is chosen from a group comprising a Grubbs I catalyst, a Grubbs II catalyst, a Hoveyda-Grubbs I catalyst and a Hoveyda Grubbs II catalyst. In a first preferred embodiment, the metathesis catalyst is a Grubbs II catalyst. In a second preferred embodiment, the metathesis catalyst is a Hoveyda Grubbs II catalyst.

According to an embodiment of the invention, the functionalising agent is a hydrogenocarbonated molecule having a symmetrical disubstituted carbon-carbon double bond and two functions chosen from a group comprising ketone, aldehyde, ester, amine, amide, imine, alcohol, ether, nitrile, thioether, thioketone, thioester, sulphoxide, phosphine, nitro, imidazole, quaternary ammonium and in this latter case the anion is chosen from a group comprising fluoride, chloride, bromide, iodide, tosylate, triflate.

In an embodiment, the functionalising agent is a 2,3-butadiene carrying two identical functions in positions 1 and 4. In this embodiment, the functionalising agent has as a general formula:

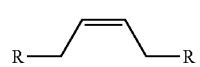

(I)

wherein,
R can be a group:
- —COR, R being chosen from a group comprising hydrogen, substituted or unsubstituted alkyl, substituted or unsubstituted aryl;
- —COOR, R being chosen from a group comprising hydrogen, substituted or unsubstituted alkyl, substituted or unsubstituted aryl, methyl-1,3-dioxolanone, methyl-oxirane;
- —OR, R being chosen from a group comprising hydrogen, substituted or unsubstituted alkyl, substituted or unsubstituted aryl, methyl-1,3-dioxolanone, methyl-oxirane;
- —NR'R", R' and R" being identical or different, each one chosen from a group comprising hydrogen, substituted or unsubstituted alkyl, substituted or unsubstituted aryl, acetyl, tert-butyl-acetyl;
- —[N$^+$R'R"R''',X$^-$], R', R", R''' being identical or different and each one chosen from a group comprising substituted or unsubstituted alkyl, substituted or unsubstituted aryl and X$^-$ being an anion chosen from the group comprising fluoride, chloride, iodide, bromide, tosylate, triflate;
- —SR, R being chosen from a group comprising hydrogen, substituted or unsubstituted alkyl, substituted or unsubstituted aryl;
- —C≡N;
- —C(=N)R, R being chosen from a group comprising hydrogen, substituted or unsubstituted alkyl, substituted or unsubstituted aryl;
- —SO$_2$R, R being chosen from a group comprising hydrogen, substituted or unsubstituted alkyl, substituted or unsubstituted aryl;
- —SO$_3$R, R being chosen from a group comprising hydrogen, substituted or unsubstituted alkyl, substituted or unsubstituted aryl;
- —NO$_2$.

In a preferred embodiment, the functionalising agent chosen from the group comprising cis-but-2-ene-diacetate, cis-but-2-ene-diketone, cis-but-2-ene-diol, cis-but-2-ene-diamine, preferably cis-but-2-ene-diacetate.

Ionic Liquids

In an embodiment, the ionic liquids of the invention are constituted of an anion and of a cation and have the general formula:

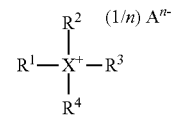

(II)

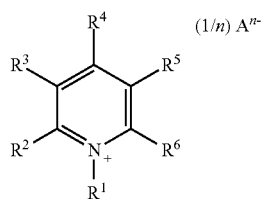

(III)

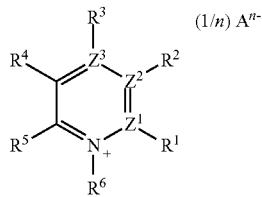

(IV)

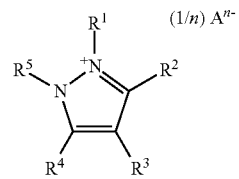

(V)

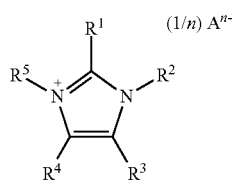

(VI)

-continued

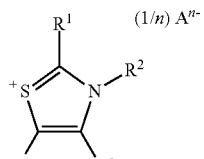
(VII)

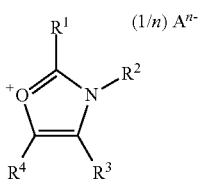
(VIII)

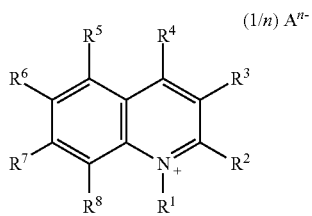
(IX)

wherein

A$^{n-}$ is an anion selected from the group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl, and alkoxy; with n being equal to 1, 2 or 3 depending on the negative charge of the aforementioned anion and (1/n) being equal to 1 if the anion has a negative charge, 1/2 if the anion has 2 negative charges and 1/3 if the anion has 3 negative charges, X is a nitrogen, phosphorus or sulphur atom with the condition that when X is a sulphur atom, at least one of the groups R$^1$, R$^2$, R$^3$, R$^4$ is zero, R$^1$, R$^2$, R$^3$, R$^4$, R$^5$, R$^6$, R$^7$ and R$^8$ are identical or different each one chosen from a group comprising hydrogen, halogen, alkoxy, substituted or unsubstituted alkyl group, substituted or unsubstituted aryl, and R$^1$-R$^2$, R$^2$-R$^3$, R$^3$-R$^4$, R$^4$-R$^5$, R$^5$-R$^6$, R$^6$-R$^7$, R$^7$-R$^8$ or R$^8$-R$^1$ can represent a cycle with 5, 6 or 7 carbon atoms, Z$^1$, Z$^2$, Z$^3$ are identical or different and are chosen from a group comprising a carbon atom and a nitrogen atom, with the condition that at least one of the atoms Z$^1$, Z$^2$ and Z$^3$ represents a nitrogen atom and when one of the atoms Z$^1$, Z$^2$ and Z$^3$ is a nitrogen atom, the corresponding group R$^1$, R$^2$, R$^3$ is zero.

In a preferred embodiment, the invention is carried out in at least one ionic liquid corresponding to one of the general formulas (II) to (IX) wherein n is equal to 1 and A$^-$ is chosen from a group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl and alkoxy.

In a preferred embodiment, the method of this invention is carried out in at least one ionic liquid with the general formula (II) wherein n is equal to 1 and A$^-$ is chosen from a group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl, and alkoxy; X is a nitrogen, phosphorus or sulphur atom and R$^1$, R$^2$, R$^3$, R$^4$ are identical or different and are chosen from a group comprising substituted or unsubstituted alkyl group, substituted or unsubstituted aryl, and alkoxy each one comprising from 1 to 25 carbon atoms, with the condition that when X is a sulphur atom, at least one of the groups R$^1$, R$^2$, R$^3$, R$^4$ is zero.

In a preferred embodiment, the ionic liquid has as a general formula (II), X being a phosphorus atom and R$^1$, R$^2$, R$^3$, R$^4$ being identical or different and chosen from a group comprising substituted or unsubstituted alkyl group, substituted or unsubstituted aryl, and alkoxy each one comprising from 1 to 25 carbon atoms; more preferably, R$^1$, R$^2$, R$^3$, R$^4$ are identical or different and are C$_4$ alkyl, a C$_6$ alkyl or a C$_{14}$ alkyl.

In a preferred embodiment, the method of this invention is carried out in at least one ionic liquid with the general formula (III) wherein n is equal to 1 and A$^-$ is chosen from a group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl, and alkoxy; R$^1$, R$^2$, R$^3$, R$^4$, R$^5$ and R$^6$ are identical or different and are chosen from a group comprising substituted or unsubstituted alkyl group, substituted or unsubstituted aryl, and alkoxy, each one comprising from 1 to 25 carbon atoms.

In a preferred embodiment, the method of this invention is carried out in at least one ionic liquid with the general formula (III) wherein A$^-$ is chosen from a group comprising PF$_6^-$, Cl$^-$, Br$^-$, I$^-$, CF$_3$SO$_3^-$, BF$_4^-$, CF$_3$CO$_2^-$, (CF$_3$SO$_2$)$_2$N$^-$, R$^2$, R$^3$, R$^4$, R$^5$, R$^6$ are H and R$^1$ is chosen from a group comprising octyl, nonyl, dodecyl, tridcyl, tetradecyl and octadecyl.

In a preferred embodiment, the method of this invention is carried out in at least one ionic liquid with the general formula (IV) wherein n is equal to 1 and A$^-$ is chosen from a group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl, and alkoxy; R$^1$, R$^2$, R$^3$, R$^4$, R$^5$ and R$^6$ are identical or different and are chosen from a group comprising substituted or unsubstituted alkyl group, substituted or unsubstituted aryl, and alkoxy, each one comprising from 1 to 25 carbon atoms, and Z$^1$, Z$^2$, Z$^3$ are identical or different and are chosen from a group comprising a carbon atom and a nitrogen atom, with the condition that at least one of the atoms Z$^1$, Z$^2$ and Z$^3$ represents a nitrogen atom and when one of the atoms Z$^1$, Z$^2$ and Z$^3$ is a nitrogen atom, the corresponding group R$^1$, R$^2$, R$^3$ is zero.

In a preferred embodiment, the method of this invention is carried out in at least one ionic liquid with the general formula (V) wherein n is equal to 1 and A$^-$ is chosen from a group comprising PF$_6^-$, NO$_3^-$, F$^-$, Cl$^-$, Br$^-$, I$^-$, R$^9$SO$_3^-$, R$^9$OSO$_3^-$, R$^9$CO$_3^-$, CF$_3$SO$_3^-$, BF$_4^-$, B(R$^9$)$_4^-$, CF$_3$CO$_2^-$, R$^9$PO$_2^-$, (CF$_3$SO$_2$)$_2$N$^-$, CH$_3$SO$_3^-$, (C$_{12}$H$_{25}$)C$_6$H$_4$SO$_3^-$, R$^9$CO$_2^-$, R$^9$ being chosen from a group comprising substituted or unsubstituted alkyl group, substituted or unsubstituted aryl, and alkoxy; R$^1$, R$^2$, R$^3$, R$^4$ and R$^5$ are identical or different and are chosen from a group comprising substituted or unsubstituted alkyl group, substituted or unsubstituted aryl, and alkoxy, each one comprising from 1 to 25 carbon atoms.

In a preferred embodiment, the method of this invention is carried out in at least one ionic liquid with the general formula (VI) wherein n is equal to 1 and $A^-$ is chosen from a group comprising $PF_6^-$, $NO_3^-$, $F^-$, $Cl^-$, $Br^-$, $I^-$, $R^9SO_3^-$, $R^9OSO_3^-$, $R^9CO_3^-$, $CF_3SO_3^-$, $BF_4^-$, $B(R^9)_4^-$, $CF_3CO_2^-$, $R^9PO_2^-$, $(CF_3SO_2)_2N^-$, $CH_3SO_3^-$, $(C_{12}H_{25})C_6H_4SO_3^-$, $R^9CO_2^-$, $R^9$ being chosen from a group comprising substituted or unsubstituted alkyl group, substituted or unsubstituted aryl, and alkoxy; $R^1$, $R^2$, $R^3$, $R^4$ and $R^5$ are identical or different and are chosen from a group comprising substituted or unsubstituted alkyl group, substituted or unsubstituted aryl, and alkoxy, each one comprising from 1 to 25 carbon atoms.

In a preferred embodiment, the liquid is with the general formula (VI) wherein $A^- = Cl^-$, $Br^-$, $I^-$, $BF_4^-$, $PF_6^-$, $CF_3SO_3^-$, $CH_3CO_2^-$, $CF_3CO_2^-$, $HSO_4^-$, $(CF_3)_2(SO_2)_2N^-$, $NO_3^-$, $MeCO_3^-$, $EtSO_4^-$ and $R^1$, $R^3$, $R^4$ are H, $R^2$ is butyl, allyl, dodecyl or octyl, and $R^5$ is methyl, butyl, octyl, docecyle or octadecyl.

In a preferred embodiment, the method of this invention is carried out in at least one ionic liquid with the general formula (VII) wherein n is equal to 1 and $A^-$ is chosen from a group comprising $PF_6^-$, $NO_3^-$, $F^-$, $Cl^-$, $Br^-$, $I^-$, $R^9SO_3^-$, $R^9OSO_3^-$, $R^9CO_3^-$, $CF_3SO_3^-$, $BF_4^-$, $B(R^9)_4^-$, $CF_3CO_2^-$, $R^9PO_2^-$, $(CF_3SO_2)_2N^-$, $CH_3SO_3^-$, $(C_{12}H_{25})C_6H_4SO_3^-$, $R^9CO_2^-$, $R^9$ being chosen from a group comprising substituted or unsubstituted alkyl group, substituted or unsubstituted aryl, and alkoxy; $R^1$, $R^2$, $R^3$ and $R^4$ are identical or different and are chosen from a group comprising substituted or unsubstituted alkyl group, substituted or unsubstituted aryl, and alkoxy, each one comprising from 1 to 25 carbon atoms.

In a preferred embodiment, the method of this invention is carried out in at least one ionic liquid with the general formula (VIII) wherein n is equal to 1 and $A^-$ is chosen from a group comprising $PF_6^-$, $NO_3^-$, $F^-$, $Cl^-$, $Br^-$, $I^-$, $R^9SO_3^-$, $R^9OSO_3^-$, $R^9CO_3^-$, $CF_3SO_3^-$, $BF_4^-$, $B(R^9)_4^-$, $CF_3CO_2^-$, $R^9PO_2^-$, $(CF_3SO_2)_2N^-$, $CH_3SO_3^-$, $(C_{12}H_{25})C_6H_4SO_3^-$, $R^9CO_2^-$, $R^9$ being chosen from a group comprising substituted or unsubstituted alkyl group, substituted or unsubstituted aryl, and alkoxy; $R^1$, $R^2$, $R^3$ and $R^4$ are identical or different and are chosen from a group comprising substituted or unsubstituted alkyl group, substituted or unsubstituted aryl, and alkoxy, each one comprising from 1 to 25 carbon atoms.

In a preferred embodiment, the method of this invention is carried out in at least one ionic liquid with the general formula (IX) wherein n is equal to 1 and $A^-$ is chosen from a group comprising $PF_6^-$, $NO_3^-$, $F^-$, $Cl^-$, $Br^-$, $I^-$, $R^9SO_3^-$, $R^9OSO_3^-$, $R^9CO_3^-$, $CF_3SO_3^-$, $BF_4^-$, $B(R^9)_4^-$, $CF_3CO_2^-$, $R^9PO_2^-$, $(CF_3SO_2)_2N^-$, $CH_3SO_3^-$, $(C_{12}H_{25})C_6H_4SO_3^-$, $R^9CO_2^-$, $R^9$ being chosen from a group comprising substituted or unsubstituted alkyl group, substituted or unsubstituted aryl, and alkoxy; $R^1$, $R^2$, $R^3$, $R^4$, $R^5$, $R^6$, $R^7$ and $R^8$ are identical or different and are chosen from a group comprising substituted or unsubstituted alkyl group, substituted or unsubstituted aryl, and alkoxy, each one comprising from 1 to 25 carbon atoms.

In a preferred embodiment, the method of this invention is carried out in at least one ionic liquid with the general formula (IX) wherein $A^-$ is chosen from a group comprising $PF_6^-$, $Cl^-$, $Br^-$, $I^-$, $CF_3SO_3^-$, $BF_4^-$, $CF_3CO_2^-$, $(CF_3SO_2)_2N^-$; $R^2$, $R^3$, $R^4$, $R^5$, $R^6$, $R^7$, $R^8$ are H; and $R^1$ is chosen from a group comprising octyl, nonyl, dodecyl, tridecyl, tetradecyl and octadecyl.

In a preferred embodiment, the ionic liquid has with the general formula (II), X being a phosphorus atom, (III), (VI) or (IX).

According to an embodiment of the invention, the ionic liquid is chosen from a group comprising imidazolium with the general formula (VI) chosen from a group comprising 1-allyl-3-methylimidazolium chloride ([AMIM][Cl]), 1-butyl-3-methylimidazolium chloride ([BMIM][Cl]), 1-butyl-3-methylimidazolium tetrafluoroborate ([BMIM][BF4]), 1-butyl-3-methylimidazolium sulphonate ([BMIM][HSO4]), 1-butyl-3-methylimidazolium hexafluorophosphate ([BMIM][PF6]), 1-butyl-3-methylimidazolium trifluoromethanesulfonate ([BMIM][CF3SO3]); phophoniums with the general formula (II) chosen from a group comprising trihexyl(tetradecyl)phosphonium chloride (CYPHOS 101), trihexyl(tetradecyl)phosphonium bromide (CYPHOS 102), trihexyl(tetradecyl)phosphonium tetrafluoroborate (CYPHOS 111), trihexyl(tetradecyl)phosphonium hexafluorophosphonate (CYPHOS 110), trihexyl(tetradecyl)phosphonium decanoate (CYPHOS 103), trihexyl(tetradecyl)phosphonium dodecylbenzenesulphonate (CYPHOS 202), bis 2,4,4-trihexyl(tetradecyl)phosphonium (trimethylpentyl)phosphinate (CYPHOS 104), trihexyl(tetradecyl)phosphonium methanesulphonate (CYPHOS 204), trihexyl(tetradecyl)phosphonium trifluoromethanesulfonyl)amide (CYPHOS 109), tributyl(tetradecyl)phosphonium dodecylbenzenesulfonate (CYPHOS 201), tributyl(tetradecyl)phosphonium methanesulphonate (CYPHOS 201).

In a preferred embodiment, the ionic liquid is CYPHOS 101 or d N,N-dioctylimidazolium bromide ([DOIM][Br]).

According to an embodiment of the invention, the method is carried out with cis-but-2-ene-diacetate (DAB) as a functionalising agent, Grubbs II as a metathesis catalyst and triphenyl(tetradecyl)phosphonium chloride as an ionic liquid.

According to another embodiment, the method is carried out with cis-but-2-ene-diacetate (DAB) as a functionalising agent, Hoveyda-Grubbs II as a metathesis catalyst and N,N-dioctylimidazolium bromide as an ionic liquid.

The invention also has for object a composition of functionalised telechelic oligomers able to be obtained by the method of the invention, said telechelic oligomers having a net functionality of 2.

According to another embodiment, the telechelic oligomers have 2 identical functions corresponding to the functions carried by the functionalising agent, said functions being chosen from a group comprising ketone, aldehyde, ester, amine, amide, imine, alcohol, ether, nitrile, thioether, thioketone, thioester, sulphoxide, phosphine, nitro, imidazole, quaternary ammonium and in this latter case the anion is chosen from a group comprising fluoride, chloride, bromide, iodide, tosylate, triflate.

According to another embodiment, the mixture of oligomer obtained according to the method of this invention is characterised in that the weight of said telechelic oligomers is between 5,000 and 300,000 g·mol$^{-1}$, preferably between 10,000 and 200,000 g·mol$^{-1}$, more preferably between 20,000 and 100,000 g·mol$^{-1}$.

According to an embodiment, the ratio between the molar weight of the high-molecular-weight polymer and the average molecular weight of the telechelic oligomers is between 90 and 1.5, preferably between 45 and 2.2, more preferably between 22 and 4.5.

In an embodiment, the telechelic oligomers are obtained at the end of the reaction with a yield from 20 to 100%, preferably from 40 to 100%, more preferably from 60 to 100%.

In another embodiment, the composition of telechelic oligomers obtained according to the method of this invention comprises a quantity of metathesis catalyst ranging from 0.1 to 100 µg/g, preferably from 1 to 50 µg/g, more preferably less than 10 µg/g. In this embodiment, the residual quantity of ruthenium in the mixture of functionalised telechelic oligomers is within the limit of the specifications given by the European medicines agency (*Guideline on the specification limits for residues of metal catalysts or metal reagents*, No. EMEA/CHMP/SWP/4446/2000).

According to an embodiment of this invention, the telechelic oligomers obtained according to the method of the invention can be recovered for the preparing of polymeric materials by reactions chosen from a group comprising polyaddition and block copolymerisation.

According to an embodiment, the high-molecular-weight polymer and having unsaturations, is placed in an ionic liquid medium containing at least one metathesis catalyst and at least one functionalising agent.

According to another embodiment, the high-molecular-weight polymer is placed in an ionic liquid medium before being mixed with the solution of ionic liquid containing at least one metathesis catalyst and at least one functionalising agent.

In an embodiment, the high-molecular-weight polymer is present in the reaction mixture at a concentration ranging from 0.01 to 5 moles per liter of ionic liquid, preferably 0.05 to 2 mol/L, more preferably from 0.1 to 1 mol/L.

According to an embodiment, the quantity of metathesis catalyst in the reaction mixture is between 0.01 to 20% in moles with respect to the number of moles of polymer, preferably 0.1 to 10%, more preferably 0.5 to 5%.

According to a preferred embodiment, the quantity of metathesis catalyst in the reaction mixture is 1% in moles with respect to the number of moles of polymer.

According to an embodiment, the quantity of functionalising agent in the reaction mixture is between 0.01 to 20% in moles with respect to the number of moles of polymer, preferably 0.1 to 10%, more preferably 0.5 to 5%.

In another embodiment, the reaction mixture is stirred under nitrogen at a temperature ranging from –20 to 300° C., preferably from 0 to 150° C., more preferably from 20° C. to 100° C.

According to a preferred embodiment, the reaction mixture is stirred at a temperature of 50° C.

According to another embodiment, the reaction is stopped by adding a solvent chosen from ethyl vinyl ether and ether, and the telechelic oligomers are obtained by precipitation after adding a solvent chosen from the group comprising acetone, isopropanol, ethanol, isobutanol, propanol, dioxane.

According to an embodiment, the mixture comprising the ionic liquids and the treatment solvents is separated from the telechelic oligomers.

According to another embodiment, the metathesis catalyst can be recycled at the end of the reaction. In this embodiment, the high-molecular-weight polymer is present in the reaction mixture at a concentration ranging from 0.1 to 15 moles per liter of ionic liquid, preferably 0.5 to 5 mol/L, more preferably from 1 to 10 mol/L.

According to this embodiment, the reaction is stopped by adding alkylidene corresponding to the metathesis catalyst used, more preferably 2-(propoxy)styrene in a quantity ranging from 70 to 150% in number of moles in relation to the number of moles of polymers, preferably from 80 to 140%, more preferably from 90 to 130%.

In this embodiment, the precipitation of the telechelic oligomers obtained is carried out with a solvent chosen from the group comprising acetone, isopropanol, ethanol, isobutanol, propanol, dioxane.

In this embodiment, the mixture comprising the precipitation solvent, the ionic liquid, the metathesis catalyst, 2-(propoxy)styrene and the functionalising agent is evaporated under reduced pressure in order to eliminate said precipitation solvent. The mixture comprising the ionic liquid, the metathesis catalyst, 2-(propoxy)styrene and the functionalising agent is then obtained and can be used to carry out another reaction by simply adding another high-molecular-weight polymer.

According to this embodiment, the reaction medium can be used between 1 and 20 times, preferably between 1 and 10 times, more preferably between 1 and 6 times without loss of effectiveness for the yield of the reaction.

EXAMPLES

Figure 1:
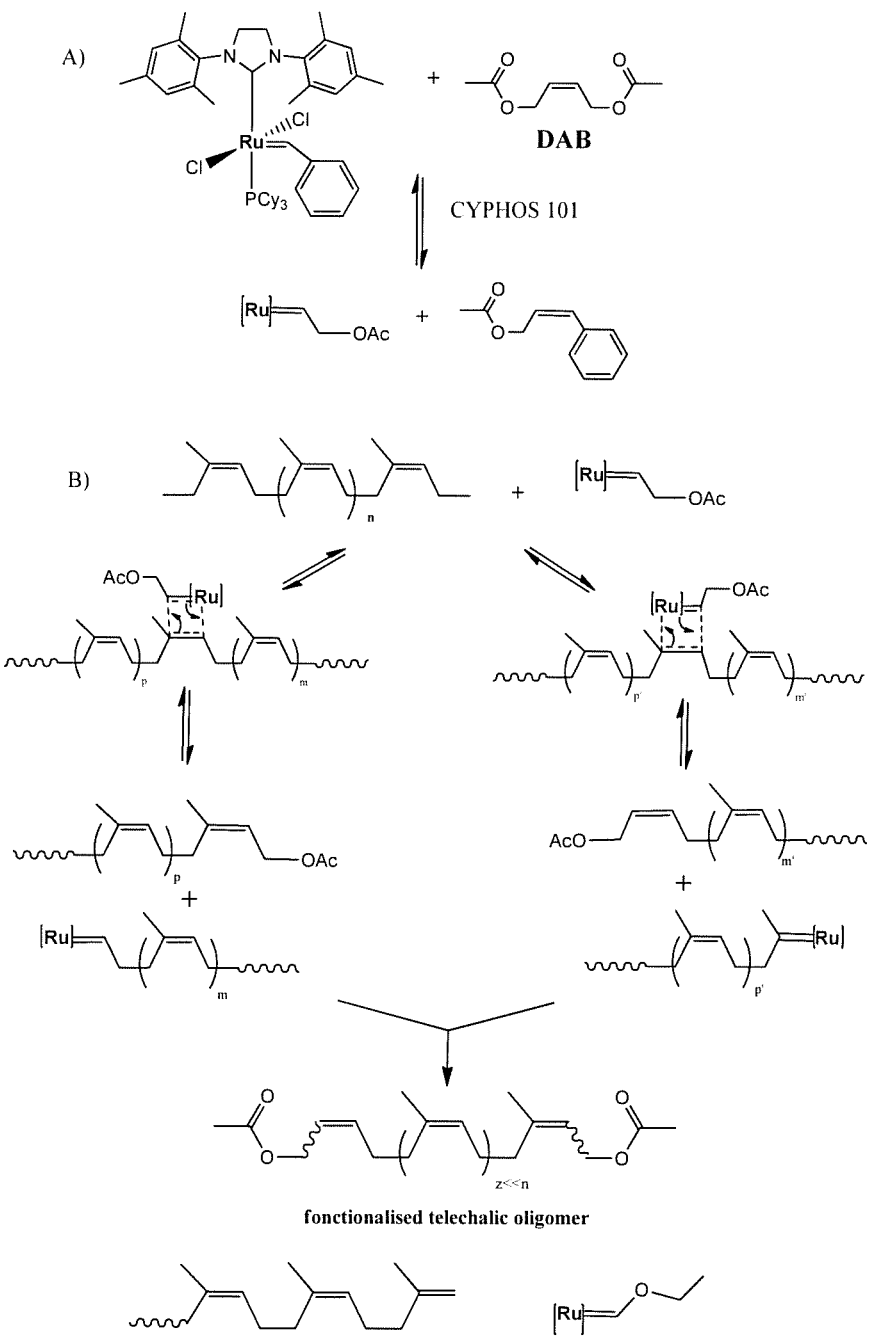
FIG. 1 is a reaction scheme of an example of preparing functionalised telechelic oligomers, according to the invention.
Figure 2:
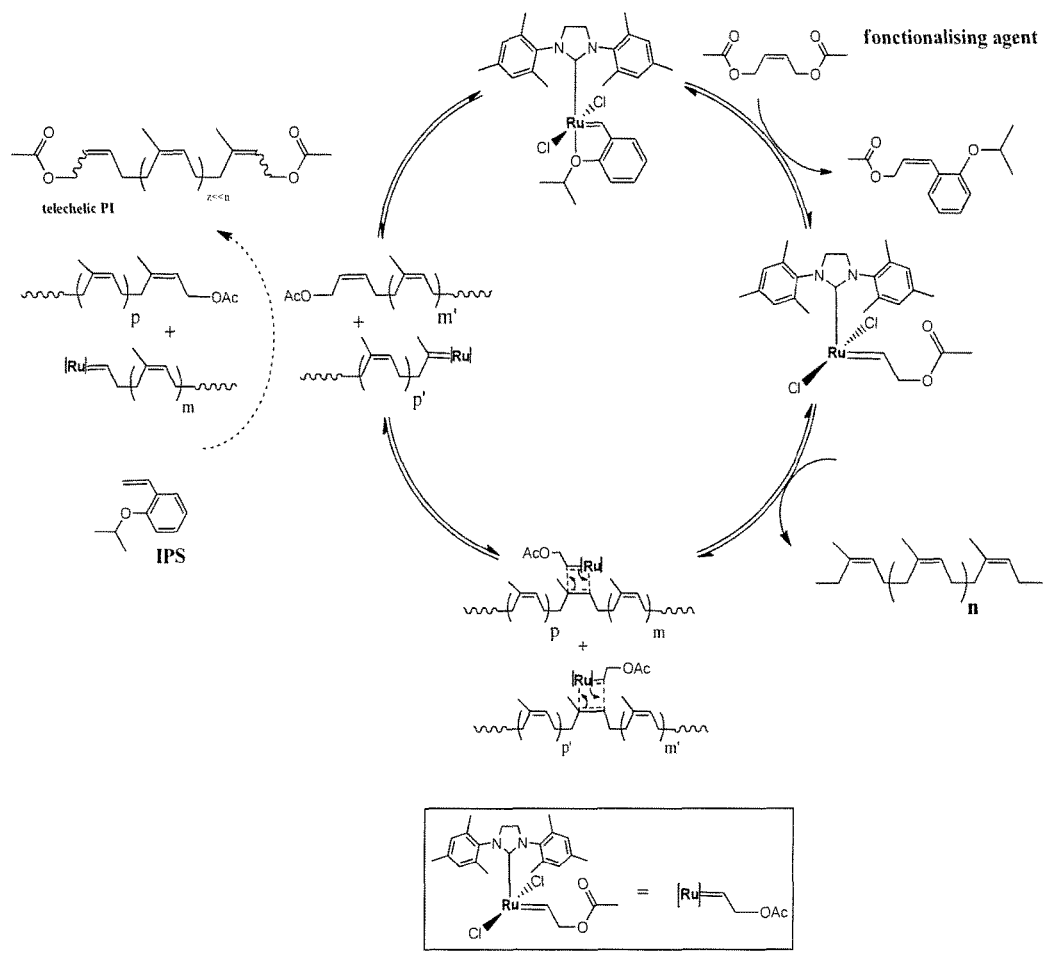
FIG. 2 is a diagram of an example of preparing telechelic oligomers according to the invention, wherein the metathesis catalyst is recycled.

This invention shall be better understood when reading the following examples which represent the invention in a non-limiting manner.

Material and Methods

The NMR spectra were recorded on a Bruker Avance Spectrometer device for the NMR of the proton (500 MHz). The chemical displacements ($\delta$) are given in ppm with for reference tetramethylsilane (TMS). The average molecular weight (Mn) and the polydiversity index are measured via steric exclusion chromatography (SEC) with a Waters system (pump 515 hplc, differential refractometer 410 and a photodiode detector) with two Styragel Waters columns (HR5E THF 7.8×300 mm from 2000 to 4×10$^6$ g·mol-1 and HR1 THF 7.8×300 mm from 100 to 4000 g·mol-1). The steric exclusion chromatography was carried out at 35° C. with as an eluent tetrahydrofurane at a flow rate of 1 mL/min. The calibration of the steric exclusion chromatography was carried out using standard linear polystyrenes (ranging from 1.27×10$^3$ g/mol to 3.04×10$^6$ g/mol). The molecular weight of the polyisoprene was corrected by the Benoit factor of 0.67 in accordance with the formula of the reference Busnel et al., *Polymer*, 1982, 23, 137. The high-molecular-weight cis-polyisoprene was used without prior purification and cryogenically ground.

All of the reactions were carried out in Schlenk tubes in a nitrogen atmosphere. The acetone is distilled on anhydrous potassium carbonate under argon. The starting products come from Sigma Aldrich and were used without prior purification. The 2-(2-propoxy)styrene, the N,N-dioctylimidazolium bromide and the cis-1,4-diacetoxy-2-butene were prepared as described in the literature (Garber et al., *J. Am.*

Chem. Soc., 2000, 122, 8168; Livi et al., Chem. Commun., 2001, 16, 1466; Otaka et al., Chem. Commun., 2003, 15, 1834).

Example 1

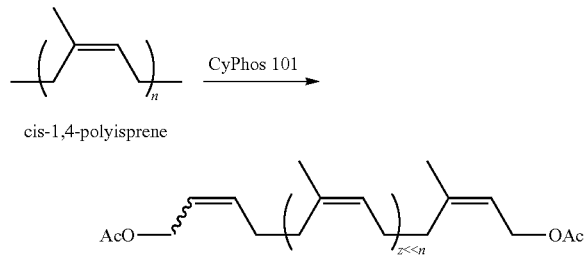

cis-1,4-polyisprene

Material and Methods

In a 100 mL Schlenk tube, 0.35 g (5,147 mmol) of polyisoprene (natural rubber) are introduced into 8 mL of a purified ionic liquid (Cyphos=101), corresponding to the mixture A. The mixture is stirred in a vacuum then placed under nitrogen at 47° C. for 15 minutes. In a 25 mL Schlenk tube are added 43.6 mg (0.0513 mmol) of Grubbs II catalyst, 17.5 mg (0.1011 mmol) of functionalising agent cis-but-2-ene-diacetate (DAB) and 3 mL of purified ionic liquid (Cyphos=101), constituting the mixture B. The mixture is stirred in a vacuum then placed under nitrogen at ambient temperature for 40 minutes. The mixtures A and B are then brought together then stirred at 47° C. for 14 h. The reaction is then stopped by adding ethyl vinyl ether still under nitrogen. Then 70 mL of anhydrous acetone are added allowing for the precipitation of the functionalised telechelic oligomers. The oligomers are then separated from the reaction medium and washed several times with acetone. The functionalised telechelic oligomers are then vacuum dried and are obtained with a yield of 97%.

Results

The results provided in tables 1 to 3 give the number average molecular weight ($M_n$) and the weight average molecular weight ($M_w$) determined by steric exclusion chromatography of the oligomers obtained as well as their polydispersity ($M_w/M_n$) and the yield from the reaction for the different reaction conditions tested.

Table 1 shows the results for the reactions carried out with different concentrations in polyisoprene.

TABLE 1

Influence of the concentration in polyisoprene in the degradation reaction

| Entry | [PI] (moles/L) | $M_n$ SEC (g/mol) | $M_w$ SEC (g/mol) | PDI | Yield % |
|---|---|---|---|---|---|
| 1 | 0.46 | 39.000 | 86.000 | 2.16 | 98 |
| 2 | 0.57 | 40.000 | 81.000 | 1.99 | 97 |
| 3 | 1.02 | 38.000 | 88.000 | 2.26 | 96 |
| 4 | 1.71 | 35.000 | 71.000 | 1.99 | 97 |
| 5 | 2.57 | 32.000 | 64.000 | 2.00 | 97 |
| 6 | 5.14 | 26.000 | 48.000 | 1.83 | 97 |

Table 2 shows the results obtained for reaction times ranging from 3 to 43 hours.

TABLE 2

Influence of reaction time in the reaction

| Entry | Reaction time (h) | $M_n$ SEC (g/mol) | $M_w$ SEC (g/mol) | PDI | Yield % |
|---|---|---|---|---|---|
| 1 | 3 | 41.000 | 85.000 | 2.05 | 98 |
| 2 | 14 | 36.000 | 73.000 | 2.00 | 97 |
| 3 | 43 | 39.000 | 65.000 | 2.03 | 99 |

Table 3 shows the results obtained for reaction times ranging from 0.5 to 6 hours for two concentrations of starting polyisoprene of 1.02 g·mol$^{-1}$ (conditions a) and 5.14 g·mol$^{-1}$ (conditions b).

TABLE 3

Change in the molar weights $M_n$ and $M_w$ as a function of reaction time

| Entry | Reaction time (h) | [PI] (moles/L) | $M_n$ SEC (g/mol) | $M_w$ SEC (g/mol) | PDI | Yield % |
|---|---|---|---|---|---|---|
| 1[a] | 0.5 | 1.02 | 64.000 | 142.000 | 2.16 | 97 |
| 2[a] | 1 | 1.02 | 46.000 | 97.000 | 2.07 | 97 |
| 3[a] | 2 | 1.02 | 37.000 | 74.000 | 1.97 | 94 |
| 4[a] | 3 | 1.02 | 38.000 | 88.000 | 2.26 | 96 |
| 1[b] | 0.5 | 5.14 | 91.000 | 239.000 | 2.62 | 98 |
| 2[b] | 1 | 5.14 | 57.000 | 129.000 | 2.24 | 97 |
| 3[b] | 2 | 5.14 | 35.000 | 72.000 | 2.03 | 95 |
| 4[b] | 3 | 5.14 | 26.000 | 48.000 | 1.83 | 97 |
| 5[b] | 6 | 5.14 | 24.000 | 44.000 | 1.87 | 99 |

NMR of the Proton of the Obtained Oligomers:
NMR $^1$H (CDCl$_3$, 500 MHz): δ (ppm) 1.70-1.60 (m, 3H); 2.12-1.95 (m, 4H), 4.50 (m, 2H); 4.59 (m, 2H); 5.34-5.44 (m, 1H); 5.53-5.63 (m, 1H); 5.71-5.83 (m, 1H).

Example 2

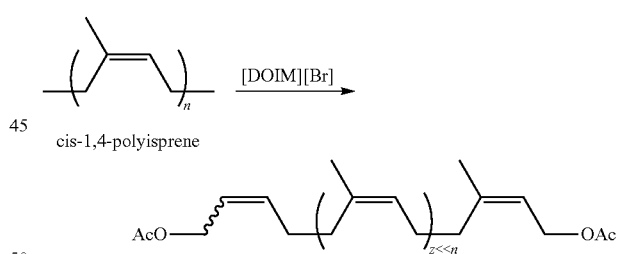

cis-1,4-polyisprene

In a 100 mL Schlenk tube, 32.1 mg (0.051 mmol) of Hoveyda-Grubbs II catalyst, 17.6 mg (0.1011 mmol) of functionalising agent cis-but-2-ene-diacetate (DAB) and 1 mL of purified ionic liquid ([DOIM][Br]) are mixed then placed under argon a stirred 40 min at ambient temperature. Then 350 mg (5.14 mmol) of natural rubber are added and the mixture is stirred for 3 hours at 50° C. under nitrogen. The reaction is then stopped by adding 10.2 mg (0.061 mmol) of 2-(2-propoxy)styrene still under nitrogen. Then 50 mL of anhydrous acetone are added allowing for the precipitation of the functionalised telechelic oligomers. The oligomers are then separated from the reaction medium and washed several times with acetone then vacuum dried and obtained with a yield of 96%.

The reaction mixture comprising the catalyst, the acetone, the ionic liquid and the 2-(2-propoxy)styrene is transferred into a flask and the acetone is evaporated in a vacuum. The resulting mixture is extracted with 5 mL of anhydrous pentane in order to eliminate the 2-(2-propoxy)styrene and vacuum dried for 15 minutes.

The reaction medium can then again be used for another reaction cycle after adding the functionalising agent and stirring for 40 minutes followed by the adding of rubber.

Results

Table 4 indicates the molecular weights by number and by weight of the oligomers obtained as well as the yield of the reaction in the ionic liquid medium ([DOIM][Br]) recycled from 1 to 6 times.

TABLE 4

Recycling of the catalyst (Hoveyda Grubbs II) in the degradation reaction of the polyisoprene in the [DOIM][Br]

| Entry | Cycle | $M_n$ SEC (g/mol) | $M_w$ SEC (g/mol) | PDI | Yield % |
|---|---|---|---|---|---|
| 1 | 0 | 23.000 | 44.000 | 1.89 | 95 |
| 2 | 1 | 52.000 | 119.000 | 2.25 | 97 |
| 3 | 2 | 59.000 | 138.000 | 2.32 | 96 |
| 4 | 3 | 64.000 | 167.000 | 2.58 | 97 |
| 5 | 4 | 70.000 | 148.000 | 2.09 | 97 |
| 6 | 5 | 79.000 | 187.000 | 2.34 | 98 |
| 7 | 6 | 113.000 | 330.000 | 2.91 | 97 |

The invention claimed is:

1. Method for producing functionalized telechelic oligomers, comprising:
a) bringing a raw material consisting of at least one high-molecular-weight polymer comprising at least two unsaturations, into contact with a solution comprising at least one ionic liquid, at least one metathesis catalyst and at least one functionalising agent chosen from hydrogenocarbonated molecules having a symmetrical disubstituted carbon-carbon double bond and two functions having a general formula:

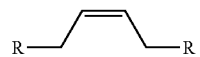

(I)

wherein, R can be a group:
—COR, R being chosen from a group comprising hydrogen, substituted or unsubstituted alkyl, substituted or unsubstituted aryl;
—COOR, R being chosen from a group comprising hydrogen, substituted or unsubstituted alkyl, substituted or unsubstituted aryl, methyl-1,3-dioxolanone, methyl-oxirane;
—OR, R being chosen from a group comprising hydrogen, substituted or unsubstituted alkyl, substituted or unsubstituted aryl, methyl-1,3-dioxolanone, methyl-oxirane;
—NR'R", R' and R" being identical or different, each one chosen from a group comprising hydrogen, substituted or unsubstituted alkyl, substituted or unsubstituted aryl, acetyl, tert-butyl-acetyl;
—[N⁺R'R"R''',X⁻], R', R", R''' being identical or different and each one chosen from a group comprising substituted or unsubstituted alkyl, substituted or unsubstituted aryl and X⁻ being an anion chosen from the group comprising fluoride, chloride, iodide, bromide, tosylate, triflate;
—SR, R being chosen from a group comprising hydrogen, substituted or unsubstituted alkyl, substituted or unsubstituted aryl;
—C≡N;
—C(═N)R, R being chosen from a group comprising hydrogen, substituted or unsubstituted alkyl, substituted or unsubstituted aryl;
—SO₂R, R being chosen from a group comprising hydrogen, substituted or unsubstituted alkyl, substituted or unsubstituted aryl;
—SO₃R, R being chosen from a group comprising hydrogen, substituted or unsubstituted alkyl, substituted or unsubstituted aryl;
—NO₂; and
b) the separation of the functionalized telechelic oligomers produced by the metathesis reaction in an ionic liquid medium of the step a).

2. Method according to claim 1, wherein said raw material is put into solution with an ionic liquid before it is brought into contact with the solution comprising a metathesis catalyst and a functionalising agent.

3. Method according to claim 1, wherein the raw material is chosen from the group comprising ethylene-propylene-diene monomer (EPDM), styrene-ethylene-butadiene-styrene (SEBS), styrene butadiene rubber (SBR), acrylonitrile-butadiene (Nitrile Butadiene Rubber NBR), partially hydrogenated acrylonitrile-butadiene (Hydrogenated Nitrile-Butadiene Rubber HNBR), Styrene-Butadiene-Styrene (SBS), thermoplastic elastomer (Thermo-Plastic Elastomer Styrenic TPE), styrenic block copolymer (Thermo-Plastic Elastomer Styrenic TPS), a styrenic block copolymer selected from the group comprising Styrene-Isoprene-Styrene (SIS), Styrene-Ethylene-Butylene-Styrene (SEBS), Styrene-Ethylene-Propylene-Styrene (SEPS), and Styrene-Ethylene-Ethylene/Propylene-Styrene (SEEPS).

4. Method according to claim 1, wherein the metathesis catalyst is chosen from a group comprising a Grubbs I catalyst, a Grubbs II catalyst, a Hoveyda-Grubbs I catalyst and a Hoveyda Grubbs II catalyst.

5. Method according to claim 1, wherein the functionalising agent is chosen from the group comprising cis-but-2-ene-diacetate, cis-but-2-ene-diketone, cis-but-2-ene-diol, and cis-but-2-ene-diamine.

6. Method according to claim 1, wherein the ionic liquid is trihexyl(tetradecyl)phosphonium chloride or N,N-dioctyl-imidazolium bromide ([DOIM][Br]).

7. Method according to claim 1, wherein the functionalising agent is cis-but-2-ene-diacetate, the metathesis catalyst is Grubbs II and the ionic liquid is trihexyl(tetradecyl) phosphonium chloride.

8. Method according to claim 1, wherein the functionalising agent is cis-but-2-ene-diacetate, the metathesis catalyst is Hoveyda-Grubbs II and the ionic liquid is N,N-dioctyl-imidazolium bromide.

9. Method according to claim 1, comprising a step wherein the metathesis catalyst contained in the liquid medium resulting from the separation of the step b) is recycled.

10. Composition of functionalized telechelic oligomers able to be produced by the method according to claim 1, characterized in that the oligomers have a net functionality of 2.

11. Method according to claim 1, wherein the raw material is a waste material containing rubber, with said method being simultaneously a method for degrading and for recycling said waste material and a method for producing telechelic oligomers.

12. Method according to claim 1, wherein the raw material is a tire waste.

* * * * *